United States Patent
Kiriyama (10) Patent No.: US 7,862,284 B2
(45) Date of Patent: Jan. 4, 2011

(54) PALLET TRANSFER SYSTEM

(75) Inventor: Masayuki Kiriyama, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 265 days.

(21) Appl. No.: 12/104,525

(22) Filed: Apr. 17, 2008

(65) Prior Publication Data
US 2008/0267749 A1 Oct. 30, 2008

(30) Foreign Application Priority Data
Apr. 26, 2007 (JP) .............................. 2007-117537

(51) Int. Cl.
*B65G 65/00* (2006.01)
(52) U.S. Cl. ................ 414/222.01; 29/33 P; 198/346.1; 198/346.2
(58) Field of Classification Search ............ 414/222.01, 414/222.07, 286, 279, 401; 198/346.1, 346.2, 198/346.3; 29/33 P; 700/213
See application file for complete search history.

(56) References Cited

U.S. PATENT DOCUMENTS 3,825,245 A * 7/1974 Osburn et al. ................. 269/30
5,099,980 A * 3/1992 Babel ....................... 198/346.1

FOREIGN PATENT DOCUMENTS

| JP | 61-033416 A1 | 2/1986 |
| JP | 2003-340673 A1 | 12/2003 |

* cited by examiner

*Primary Examiner*—Donald Underwood
(74) *Attorney, Agent, or Firm*—Burr & Brown (57) ABSTRACT

A pallet transfer system capable of smoothly transferring a pallet between a machine tool and a pallet conveying device is provided. The pallet transfer system includes an intermediated station to temporally place a pallet between a front ward position of a pallet stand-by position and the pallet stand by position. The pallet on a conveying plate at a stand-by position is carried to a temporary placing position by horizontally moving the conveying plate. Then the pallet is transferred to the intermediate position by being supported by lift arms which are raised from the conveying plate. Further, the pallet, supported by the lift arms, is transferred from the intermediate station to a stacker crane by advancing the stacker crane toward the intermediate station side and entered into an entering space below the pallet.

4 Claims, 8 Drawing Sheets

PALLET TRANSFER SYSTEM

This application claims the benefit of Japanese Patent Application Number 2007-117537 filed on Apr. 26, 2007, the entire contents of which are incorporated by reference.

BACKGROUND OF THE INVENTION

1. Field of the Invention

The present invention relates to a pallet transfer system for transferring a pallet, on which a work piece is placed, between a machine tool, e.g., a horizontal machining center, and a pallet conveying device having a stacker crane.

2. Description of the Background Art

Patent document 1 discloses a conventional machine tool having a pallet exchanger where a pallet on which a work piece is placed is exchanged between a machining-side position and a stand-by position by rotation of the pallet. In the conventional machine tool as disclosed in Patent document 1, a stacker crane is used when a pallet is exchanged and carried between the stand-by position of the machine tool and a pallet housing station which is separately provided from the machine tool. The stacker crane is capable of moving on a rail laid between the machine tool and the pallet housing station, being advanced and retreated by arms, and being raised and lowered. In the conventional machine tool, the stacker crane is moved to a predetermined position on the rail, being advanced toward the stand-by position by extension of the arms, being raised, and receiving a pallet from the stand-by position, and carrying the received pallet to the pallet housing station after retreating the pallet toward a rail side by retracting of the arms. It should be noted that the transferring operation where the pallet is transferred from the stacker crane to a stand by position is made in reverse order to the receiving operation of the pallet. The stacker crane is advanced toward the stand-by position by extension of the arms at the predetermined position, and then lowered so as to transfer a pallet to the stand-by position.

However, when a pallet is directly received and transferred between the stand-by position and the stacker crane as described above, the extending distance of arms in the stacker crane may be long. Therefore, the weight of a work piece placed on a pallet is limited depending on strength of the arms. Further, when the size of arms (that is, a stacker crane) is increased in order to improve the strength of the arms, such a crane cannot be applied to a conventional machine tool, and a larger installation space and operation space become necessary, which results in high cost.

Therefore, for example, Patent document 2 discloses a conventional machine tool in which an intermediate station is provided between a predetermined position of a stacker crane and a stand-by position so as to shorten the extending distance of arms.

[Patent document 1] Japanese Unexamined Patent Publication No. 2003-340673

[Patent document 2] Japanese Unexamined Patent Publication No. 1986-33416

However, when an intermediate station is provided, the device size is enlarged and the structure of the device becomes complicated. Therefore, smooth transfer of a pallet between a stand-by position of a machine tool and a stacker crane and rationalization of the structure of the transfer are needed.

Therefore, an object of the present invention is to provide a pallet transfer system capable of smoothly transferring a pallet between a machine tool and a pallet conveying device, and rationalize the structure.

SUMMARY OF THE INVENTION

In order to achieve the object, a first aspect of the present invention is a pallet transfer system for transferring a pallet between a pallet stand-by position and a pallet conveying device. The pallet stand-by position is a position before the pallet is transferred to a machining position in a machine tool, and the pallet conveying device includes a crane device, which can move on a rail provided on the frontward side of the pallet stand-by position in the right and left directions, can be advanced and retreated in the front and back directions, and can be raised and lowered. The pallet is transferred by the crane device being advanced and retreated in the front and back directions at the frontward position of the pallet stand-by position. An intermediate station is provided so that a pallet is temporally placed between the frontward position and the pallet stand-by position. The intermediate station includes a pair of lift arms lifted by a lifting device so as to support the pallet at the pallet temporarily placing position.

A conveying plate on which the pallet is placed and transferring means which moves the conveying plate horizontally to a pallet temporally placing position are provided at the pallet stand-by position. The pallet on the conveying plate at the pallet stand-by position is carried to the pallet temporarily placing position by horizontal move of the conveying plate, and then the pallet is transferred from the machine tool to the intermediate station by being supported by the lift arms which are raised. The crane device is advanced toward the intermediate station side so as to enter into a space which is between the lift arms on a lower side of the pallet, and the pallet is transferred from the intermediate station to the pallet conveying device by relatively up and down moving of the crane device and the lift arms. The pallet is supported by the lift arms at the pallet temporarily placing position.

A second aspect of the present invention is the pallet transfer system in the first aspect, wherein the conveying plate includes a first positioning pin to determine a position of a pallet which is in a state placed on the conveying plate and the crane device includes a second positioning pin to determine a position of a pallet which is in a state supported by the crane device. Further, the pallet includes a pin hole capable of being inserted with both of a first positioning pin and a second positioning pin, and both of a pin hole for the first positioning pin and a pin hole for the second positioning pin are share with this pin hole.

A third aspect of the present invention is the pallet transfer system in the first and second aspects, wherein the intermediate station is provided adjacent to the pallet stand-by position. A pair of supporting walls is projected between the lift arms. A plurality of cam followers is arranged in the frontward and backward directions on an opposite side of the supporting walls. The conveying plate moved from the pallet stand-by position to the pallet temporally placing position is supported so as to horizontally movable by the cam followers. The crane device is entered between the supporting walls.

According to the present invention, an intermediate station is provided between a rail and a pallet stand-by position in order to temporally place a pallet. The pallet is transferred using the intermediate station as a pallet temporarily placing position. Therefore, a length of extension and retraction of the arms in the back and front directions can be shortened which reduces a crane device size. Further, it is not necessary to limit a weight of a work piece to be placed on a pallet. Thus, flexibility is improved and the pallet transfer system and can be applied to a pallet conveying device having a conventional crane device.

Further, at the intermediate station, a pair of lift arms and a lifting device at the intermediate station are provided. The pair of a lift arm supports the pallet at the pallet temporarily placing position and the lifting device raise and lowers the lift arm. At the pallet stand- by position, a conveying plate and transferring means are provided. The conveying plate can place the pallet thereon and the transferring means is to horizontally move the conveying plate to the pallet temporally placing position. In the pallet transfer system, the pallet on the conveying plate at the pallet stand-by position is carried to the pallet temporally placing position by horizontally moving of the conveying plate, and is transferred from the conveying plate to the intermediate station by the raised and lowered lift arms which support the pallet. Further, the crane device is moved toward the intermediate station side so as to enter into a space between the lift arms on a lower side of the pallet, and the pallet supported by the lift arms at the pallet temporally placing position is transferred to the crane device from the lift arms by relatively up and down moving between the crane device and the lift arms. Therefore, it is not necessary to provide a driving device to raise and lower a conveying plate on the pallet stand-by position side, and a structure of the tool on the pallet stand-by position side, that is, a structure of a machine tool can be simplified. When a heavy work piece is transferred, a pallet can be transferred more smoothly and stably than a system where the pallet is transferred by up and down moving of a conveying plate. Furthermore, a larger space for entering the crane device can be kept on the lower side of the because the transfer means for a conveying plate is provided on the machine tool side, the pallet is raised and supported by lift arms, and the conveying plate is retreated when the crane device is entered.

According to the second aspect of the present invention, the conveying plate includes a first positioning pin to determine a position of a pallet which is in a state placed on the plate. The crane device includes a second positioning pin to determine the position of a pallet which is in a state supported by the device. The pallet includes a pin hole capable of being inserted with both of the first positioning pin and the second positioning pin, and a pin hole for the first positioning pin and a pin hole for the second positioning pin are shared with this pin hole. Therefore, a structure for determining the position of the pallet can be simplified which results in that a pallet can be simplified and a cost can be reduced.

According to the third aspect of the present invention, in addition to the first aspect, the intermediate station is provided adjacent to the pallet stand-by position. A pair of supporting walls is projected between the lift arms and a plurality of cam followers is arranged in the frontward and backward directions on the opposite side of the supporting walls. The conveying plate which is moving from the pallet stand-by position to the pallet temporally placing position is supported by the come followers so as to be horizontally movable. Therefore, when a pallet is transferred from the pallet stand-by position to the pallet temporarily placing position, the weight of a work piece does not cause deformation of the conveying plate or breakdown of the transfer means. Thus, the pallet transfer system can properly handle a larger work piece.

DETAILED DESCRIPTION OF THE INVENTION

A pallet transfer system as one embodiment of the present invention will be described below referring to drawings.

Figure 1:
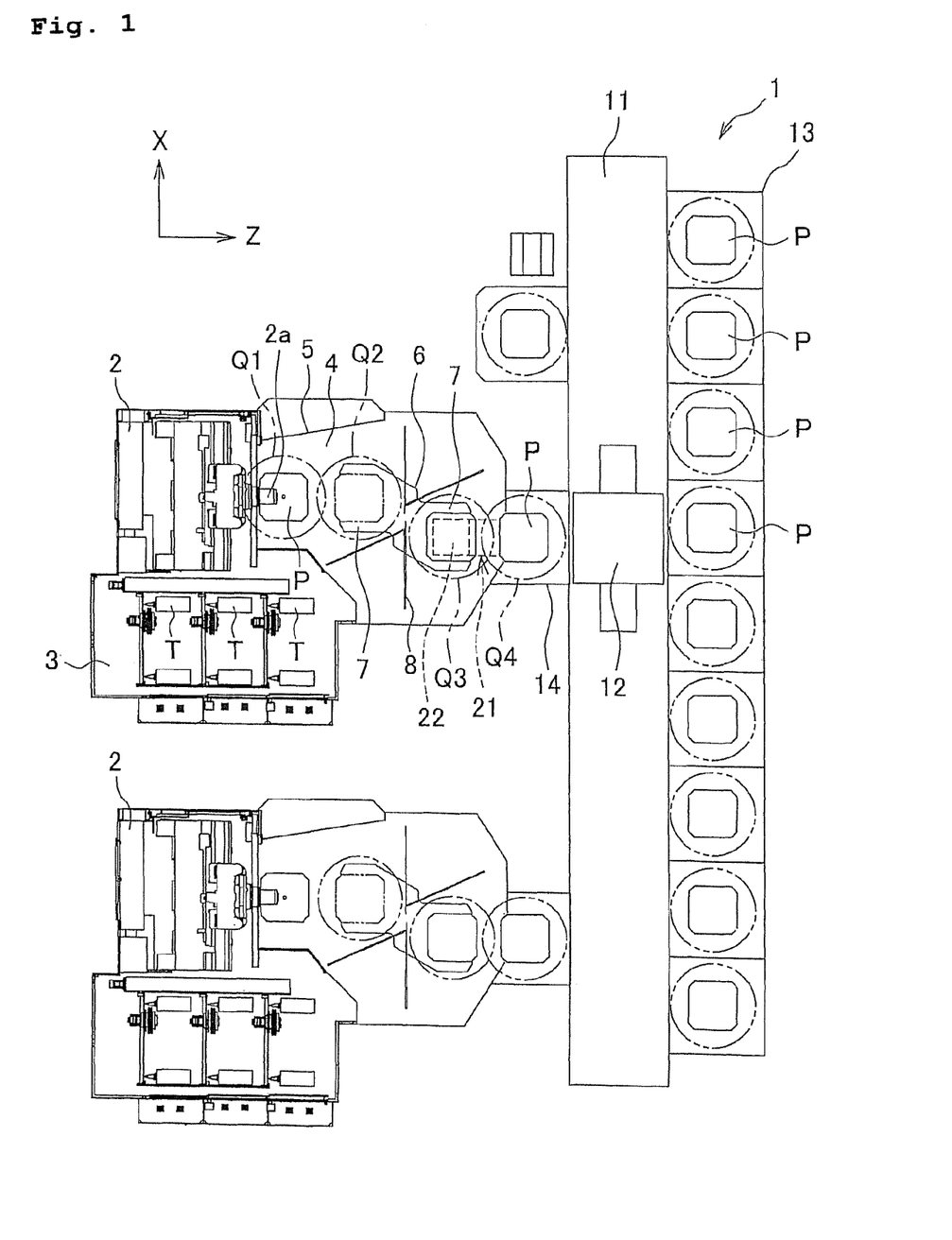
FIG. 1 is a view to illustrate the arrangements of a pallet conveying device and a horizontal machining center from an upper direction.

FIG. 1 is a view to illustrate the arrangements of a pallet conveying device 1 and horizontal machining centers 2, 2 from an upper direction. In addition, an X axis direction is a horizontal direction of a pallet transfer system, a Z axis direction is a front and back directions of the system, and a Y axis direction (inside and outside directions in FIG. 1) vertically crossing the X axis and the Z axis is a vertical direction of the system.

A horizontal machining center 2 is movable in the X axis direction and the Y axis direction which is a vertical direction, and includes a main spindle 2a as a rotary axis in the Z axis direction. The machining center main body adjacently includes a tool magazine 3 for housing tools on a left side thereof, the tools T, T . . . are to be attached to the main spindle 2a. Further, a machining space 4 for machining a work piece (not illustrated) placed on a pallet P positioned at a machining position Q1 is provided on a frontward side of the main spindle 2a. An operation door 5 for opening and closing the machining space 4 is arranged on a right side of the machining space 4. Further, a pallet exchange arm 6 for exchanging the pallet P between a machining-side position Q2 and a stand-by position Q3 is provided on the frontward side of the machining center main body. The machining-side position Q2 is for transferring the pallet P to the machining position Q1.

The pallet exchange arm 6 has a pair of holding parts 7 and 7 having a U shape in a plane view and is capable of horizontally rotating centering on a spindle in parallel with the Y axis direction by a driving device not illustrated. A driving device enables to raise and lower the pallet exchange arm 6 with an oil cylinder and the like. By the horizontal rotation move and up and down move of the exchange arm 6, the pallet P having a machined work piece thereon at the machining-side position Q2 is exchanged with the pallet P having an un-machined work piece thereon at the stand-by position Q3 and then a position of the each pallet is determined. A front cover 8 is attached to the pallet exchange arm 6 for closing the front part of the machining space 4. Further, holding parts 7 and 7 of the pallet exchange arm 6 have an exchange-time positioning pin (not illustrated) which can be inserted into a second pin hole of a pallet P described below and the position of the pallet P in each holding part 7 is determined by the exchange-time positioning pin when the pallet exchange arm 6 is rotated.

Figure 2:
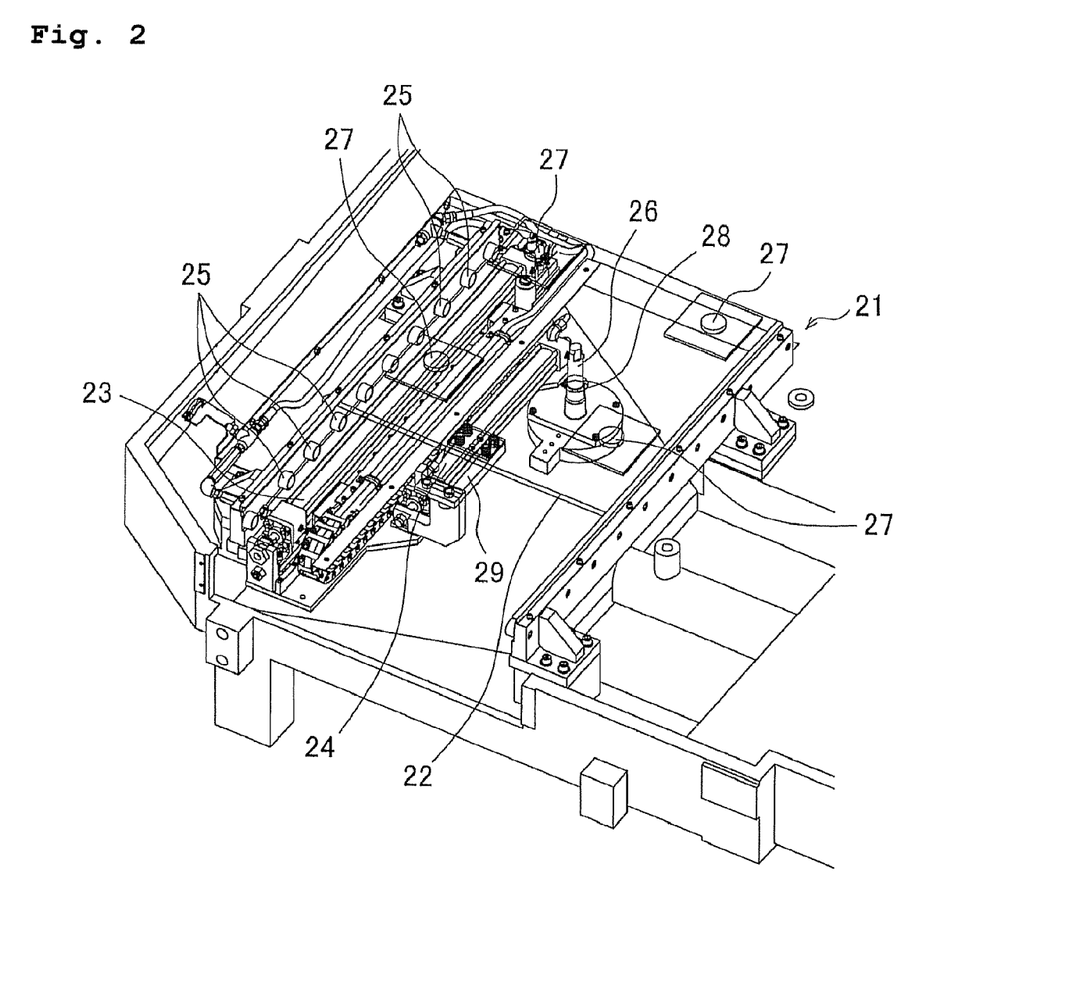
FIG. 2 is a perspective view to illustrate a state that the conveying plate is at a stand-by position.
Figure 3:
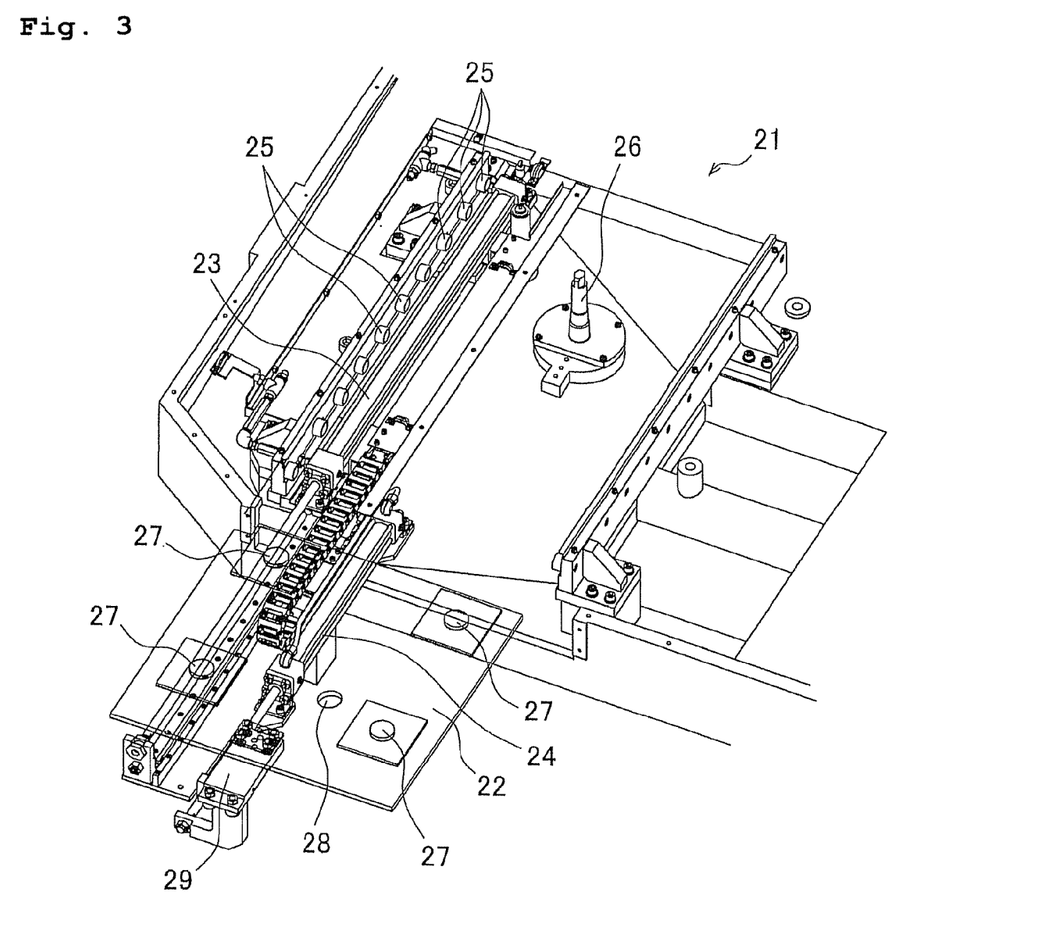
FIG. 3 is a perspective view to illustrate the state that the conveying plate is advanced on an intermediate station side.

A pallet station 21 which is provided at the stand-by position Q3 will be explained referring to FIGS. 2 and 3. The pallet station 21 determines a position of the pallet P at the stand-by position Q3 and transfers the pallet P between the stand-by position Q3 and an intermediate station 14. FIG. 2 is a perspective view to illustrate a state that a conveying plate 22 is at the stand-by position Q3. FIG. 3 is a perspective view to illustrate a state that the conveying plate 22 advances on an intermediate station 14 side.

The pallet station 21 includes the conveying plate 22, a first cylinder (transfer means) 23, a second cylinder (transfer means) 24, a guide part, and a conveying plate positioning pin 26. The conveying plate 22 moves between the stand-by position Q3 and the temporarily placing position Q4 in the intermediate station 14 by sliding toward the Z axis direction. The first and second cylinders 23 and 24 are for sliding the conveying plate 22. The guide part has a plurality of cam followers 25, 25, . . . for guiding the sliding of the conveying plate 22. The conveying plate positioning pin 26 determines a position of the conveying plate 22 at the stand-by position Q3.

The conveying plate 22 is a plate body capable of placing the pallet P on an upper face thereof in the plate state of placing. The conveying plate 22 has first positioning pins 27, 27, . . . projected from both left and right side edges on the front side and both left and right side edges of the back side. These first positioning pins 27, 27, . . . can be inserted into a first pin hole (not illustrated) provided at the pallet P. Therefore, the conveying plate 22 can determine a position of the pallet P while not restricting on vertically moving of the pallet P. Further, the conveying plate 22 has a conveying plate positioning hole 28 provided at an approximately center part thereof, into which the conveying plate positioning pin 26 can be inserted to position the conveying plate 22 at the stand-by position Q3. It should be noted that the conveying plate 22 is formed to be slightly smaller than the pallet P. When the pallet P is positioned on the conveying plate 22, a peripheral edge part of the pallet P more outwardly projects than the peripheral edge part of the conveying plate 22. Further, in the four corners of the peripheral edge part of the pallet P second pin holes (not illustrated) are provided.

Further, both the first cylinder 23 and the second cylinder 24 are attached so as to extend and retracted in the Z axis direction so that the conveying plate 22 can be moved in the Z axis direction. As a so-called child-parent relationship, the second cylinder 24 is attached to enable to move in the Z axis direction corresponding to the extension and retraction of the first cylinder 23. The conveying plate 22 is connected with the second cylinder 24 with a connection plate 29.

Furthermore, the guide part includes the plurality of cam followers 25, 25, . . . arranging in the Z axis direction. When the conveying plate 22 slides, the guide part guides a lower face of both edges on the right and left sides of the conveying plate 22.

In addition, the conveying plate positioning pin 26 is provided on a lower side of the conveying plate 22 at the stand-by position Q3 so as to move vertically in the Y axis direction by a hydraulic device (not illustrated). With this vertical movement, the conveying plate 22 can be positioned and released at the stand-by position Q3.

In a factory, a plurality of the horizontal machining center 2 including a pallet exchange arm such as the pallet exchange arm 6 and a pallet station such as the pallet station 21 is arranged in the horizontal direction having the same arrangement.

On the other hand, a pallet conveying device 1 is provided on a front side of the stand-by position Q3. The pallet conveying device 1 includes a rail 11 provided in the X axis direction along a plurality of the horizontal machining centers 2, 2, . . . , a stacker crane (a crane device) 12 capable of advancing and retreating in the Z axis direction by extension and retraction of an arm (not illustrated) in the Z axis direction, and a pallet housing station 13 capable of housing the plurality of pallets P, P, . . . . The stacker crane 12 can move in the X axis direction on the rail 11, and can move (that is, go up and down) in the Y axis direction by a cylinder device (not illustrated). In addition, the stacker crane 12 has a second positioning pin (not illustrated) on the appropriate position of an upper face thereof to be inserted into a first pin hole of the pallet P.

Figure 4:
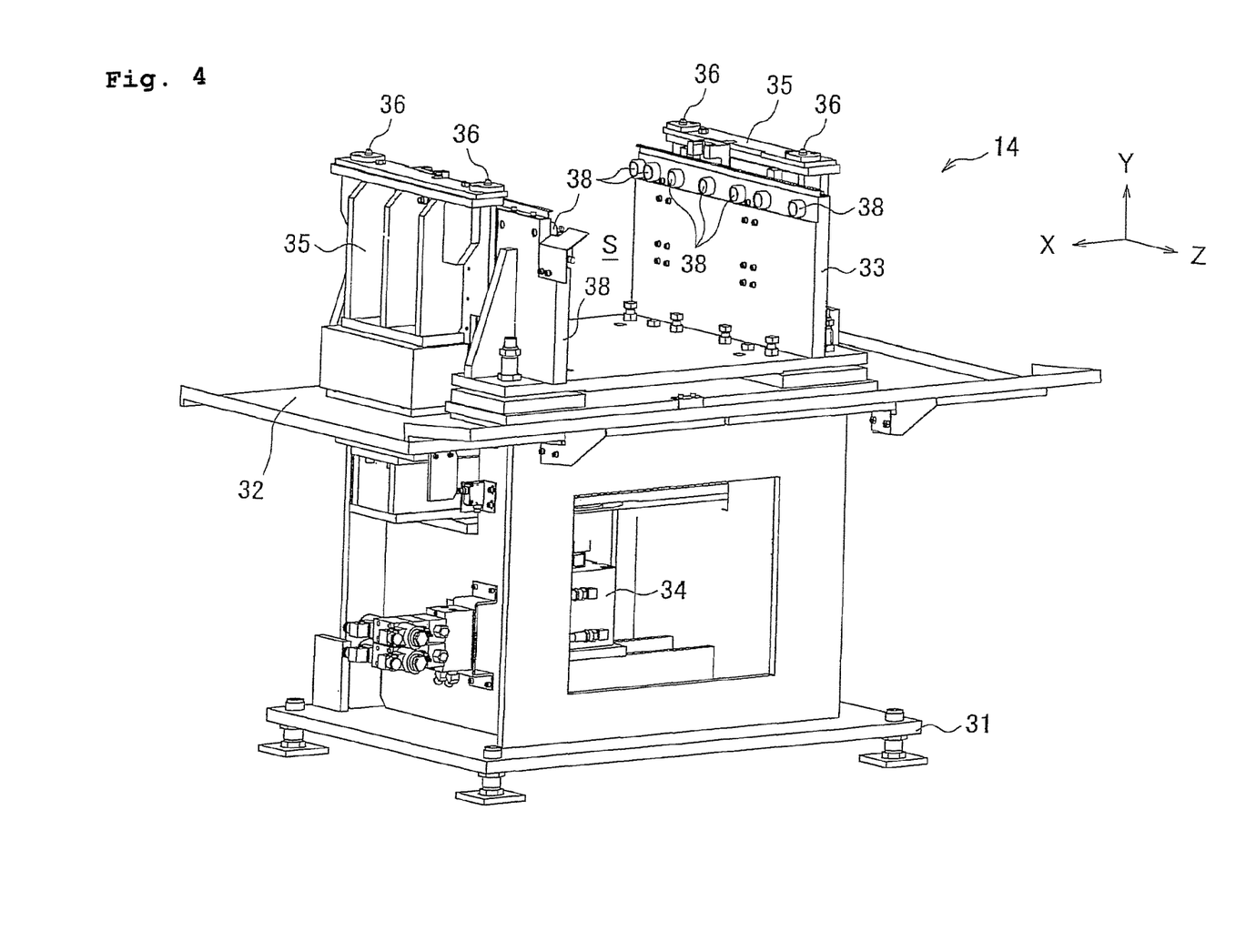
FIG. 4 is a perspective view of an intermediate station.
Figure 5:
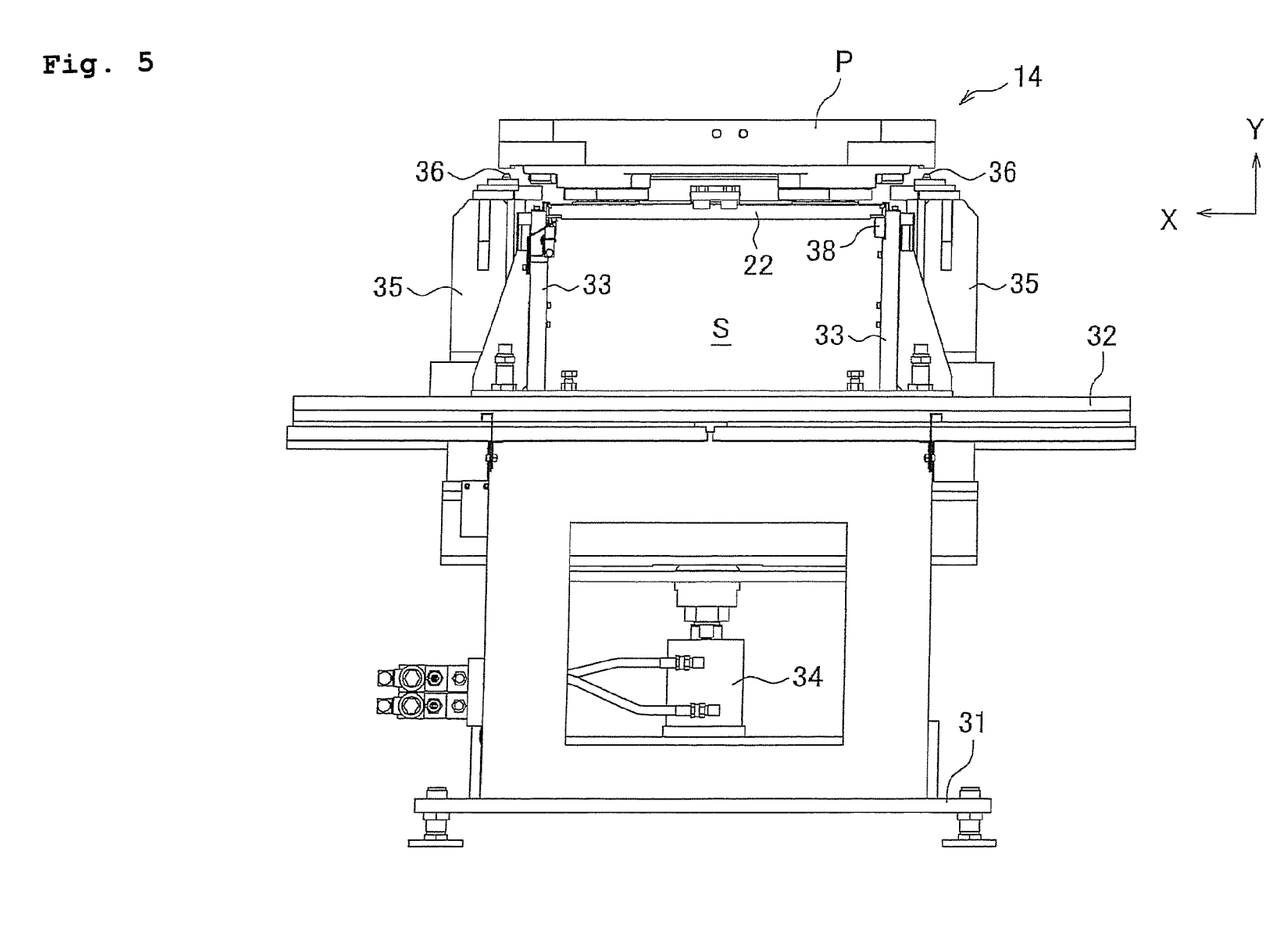
FIG. 5 is a front view to illustrate a state that a pallet is conveyed to an intermediate station by the conveying plate.

Further, the pallet housing station 13 is provided farther on the front side than the rail 11. Between the stand-by position Q3 and the rail 11, the intermediate station 14, which is for temporarily placing the pallet P when the pallet P is transferred between the stand-by position Q3 and the stacker crane 12, is provided adjacently to the horizontal machining center 2. The intermediate station 14 will be described referring to FIGS. 4 and 5. FIG. 4 is a perspective view of the intermediate station 14 and FIG. 5 is a front view for illustrating a state that the pallet P is conveyed to the intermediate station 14 by the conveying plate 22.

The intermediate station 14 includes a bed 31 fixed on a floor in a factory and a supporting part having a C-shaped in a front view (an opening is in the upward direction), which is provided at an upper part of the bed 31. The supporting part includes a pair of supporting walls 33 and 33 on a plate-like base plate 32, and the supporting walls 33 and 33 are provided projecting and extend in the Z axis direction. The supporting walls 33 and 33 have approximately similar horizontal intervals with respect to a horizontal width of the conveying plate 22. A plurality of cam followers 38, 38, . . . arranged in parallel in the Z axis direction on the opposite side of each supporting wall supports the conveying plate 22 so as to enable the conveying plate 22 to horizontally move. In addition, an entering space S for the stacker crane 12 or the conveying plate 22 is formed between the supporting walls 33 and 33 and the height provided between the cam follower 38 and the base plate 32 is sufficiently set for the stacker crane 12 to enter.

Further, a lift arm 35 is provided on an outer side of each supporting wall 33 (where the opposite side is an inner side) so as to be raised and lowered by a lifting device 34 provided at a lower part of the base plate 32 of the bed 31. An upper face of each lift arm 35 is formed like a long horizontal face extending in the Z axis direction. The third positioning pins 36 and 36 capable of being inserted into a second pin hole of the pallet P are upwardly projected from a front part and a back part of the horizontal face part. In addition, the lift arms 35 and 35 on the right and left sides are controlled so as to be raised and lowered while synchronizing the both.

Then, a transfer of the pallet P using the intermediate station 14 having the above-described structure will be described referring to FIGS. 6A to 6J. FIGS. 6A to 6J are schematic views to illustrate transferring of the pallet P between the horizontal machining center 2 and the stacker crane 12.

Figure 6A:
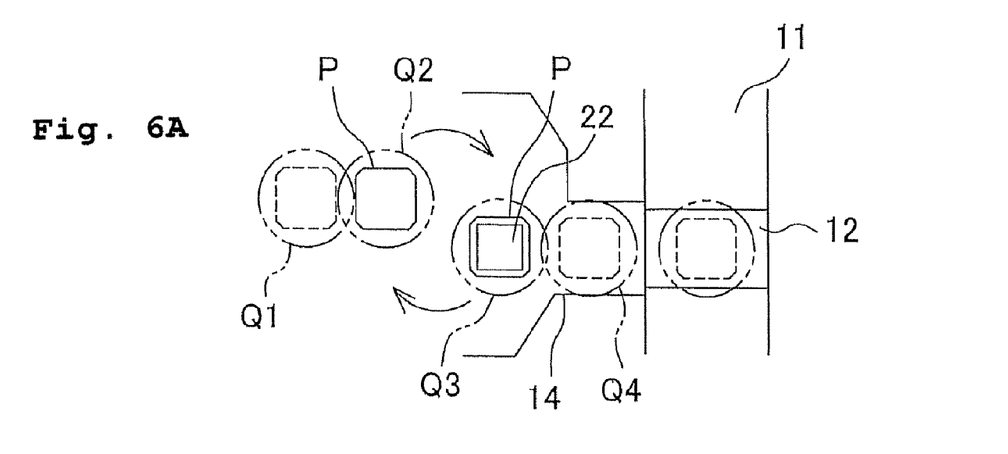
FIG. 6 is a schematic view to illustrate that the pallet is transferred between a horizontal machining center and a pallet conveying device.

When machining to a work piece on the pallet P at the machining position Q1 is finished, the pallet P is moved to the machining-side position Q2 so as to be held by one of the holding parts 7 of the pallet exchange arm 6. Then, the pallet exchange arm 6 is raised and rotated by 180° so as to exchange the pallet P having a machined work piece thereon at the machining-side position Q2 with a pallet having an un-machined work piece at the stand-by position Q3. Then, the pallet exchange arm 6 is lowered and determines a position of each pallet at each position (FIG. 6 A). The pallet P is positioned at the stand-by position Q3 by insertion of each first positioning pin 27 into each first pin hole of the pallet P.

Figure 6B:
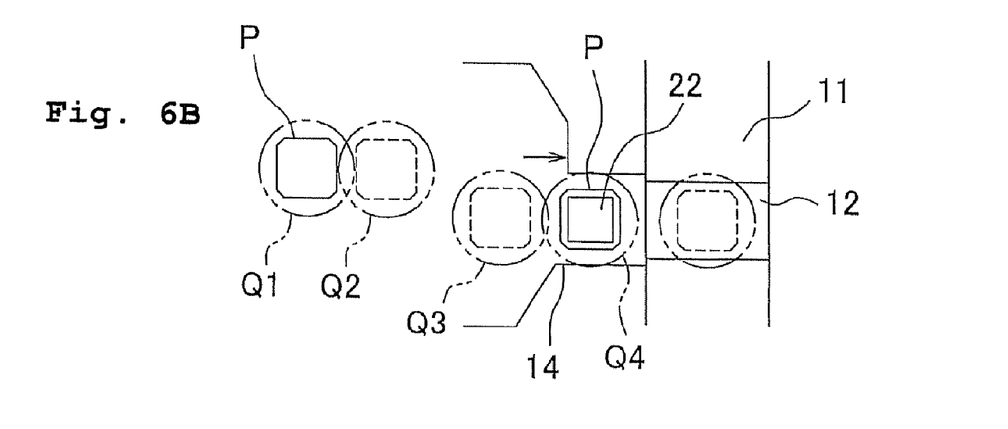

Then, the conveying plate positioning pin 26 is lowered so as to be removed from the conveying plate positioning hole 28, and the conveying plate 22 is released at the stand-by position Q3. Then, the first cylinder 23 and the second cylinder 24 are extended in this order. At this time, the pallet P is advanced with the conveying plate 22 on the rolling cam followers 25, 25, . . . , and is carried to the intermediate station 14 side (FIG. 6B). On the other hand, in the intermediate station 14, the cam followers 38, 38, . . . support the conveying plate 22 from below so that the conveying plate 22 is moved to the temporarily placing position Q4.

Figure 6C:
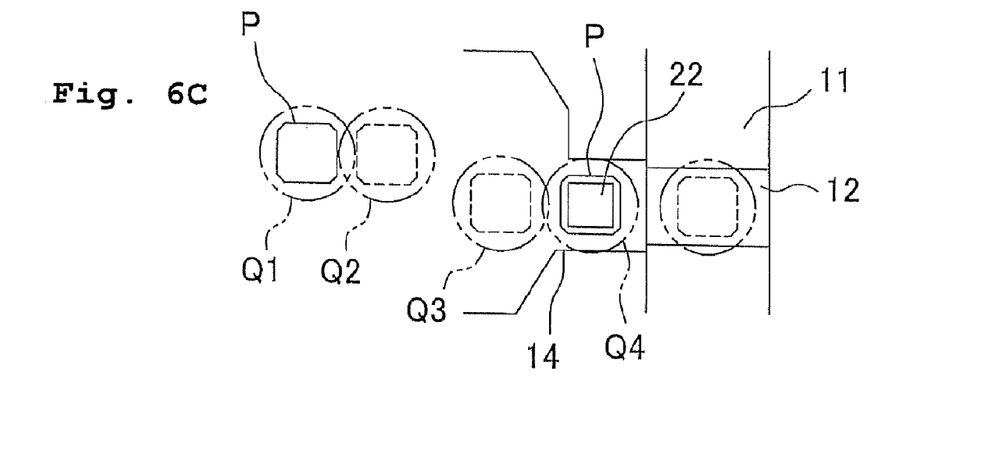

When the pallet P is positioned at the tempotally placing position Q4, the lifting device 34 is operated to raise the lift arms 35 and 35, so that the pallet P is raised until the position where the pallet P is released. In other words, the pallet P is raised until the position where the first positioning pins 27, 27, . . . of the conveying plate 22 are removed from the first pin holes of the pallet P) (FIG. 6 C). Thereby, the pallet P is transferred from the conveying plate 22 to the intermediate station 14. Here, the third positioning pins 36 and 36 provided on an upper face of each lift arm 35 are inserted into the second pin holes of the pallet P and the pallet P is positioned on the lift arms 35 and 35.

Figure 6D:
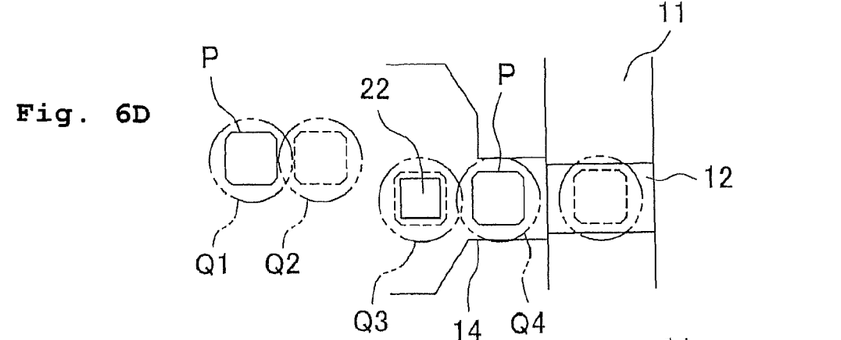

After the conveying plate 22 is retreated toward the stand-by position Q3 side (FIG. 6D, the stacker crane 12 stood-by on the rail 11 in a front direction of the temporally placing position Q4 is backwardly advanced so as to enter into the entering space S on the lower side of the pallet P. Then, the stacker crane 12 is raised at the temporally placing position Q4, the pallet P supported by the lift arms 35 and 35 are further raised until to release the positioning by the third positioning pins 36, 36, . . . and the second pin holes. Then, the pallet P is transferred from the intermediate station 14 to the stacker crane 12. At this time, the second positioning pin of the stacker crane 12 is inserted into the first pin hole of the pallet P, and thus the pallet P is positioned on the stacker crane 12.

Figure 6E:
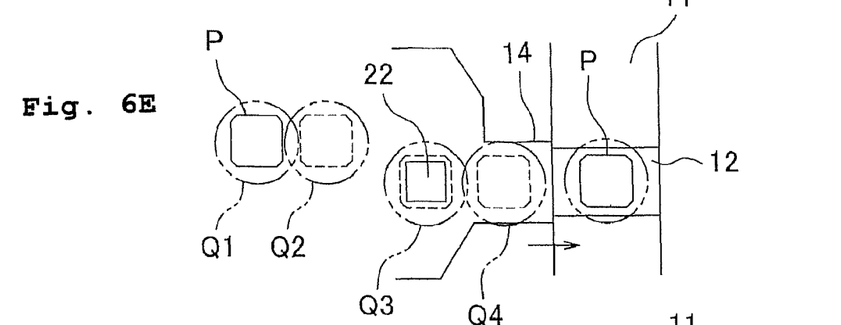

When the pallet P is supported by the stacker crane 12, the stacker crane 12 is advanced and retreated from the entering space S (FIG. 6E).

Figure 6F:
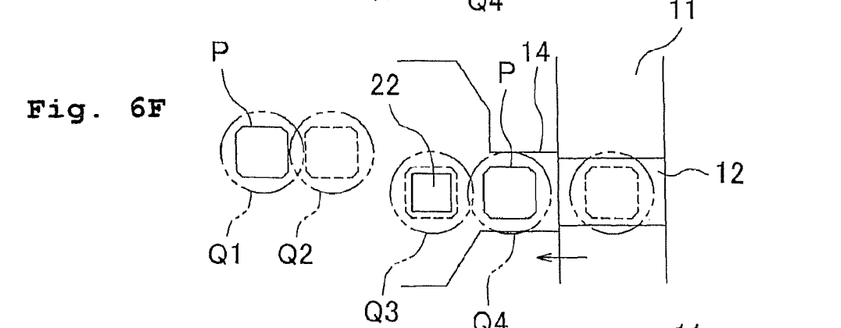

Then, the stacker crane 12 moves to the pallet housing station 13 and exchanges the pallet P on which a machined work piece is placed with a new pallet P on which an un-machined work piece is placed, and returns to a position in the front direction of the temporarily placing position Q4. Then, the stacker crane 12 is backwardly advanced and entered into the entering space S of the intermediate station 14. Further, the stacker crane 12 is lowered and the new pallet P is transferred to the lift arms 35 and 35 in the rising state (that is, the new pallet P is positioned at the temporarily placing position Q4), and then the stacker crane 12 is advanced and retreated from the entering space S (FIG. 6F). In addition, when the pallet P is transferred from the stacker crane 12 to the intermediate station 14, positioning/releasing by each positioning pin and positioning hole are similarly carried out as above described. Furthermore, these positioning/releasing are also similarly carried out when the pallet P is transferred between the intermediate station 14 and the conveying plate 22.

Figure 6G:
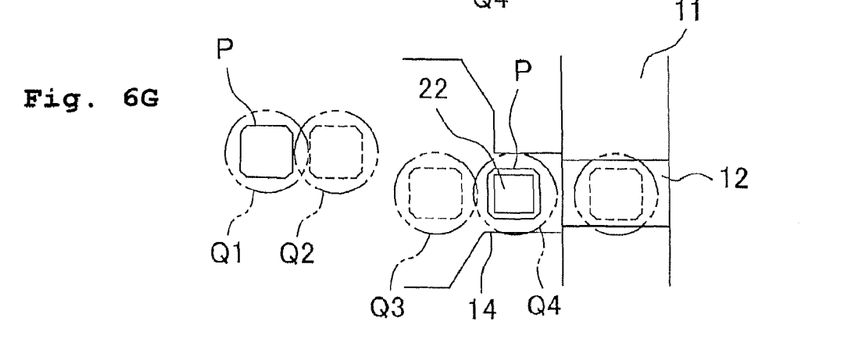
Figure 6H:
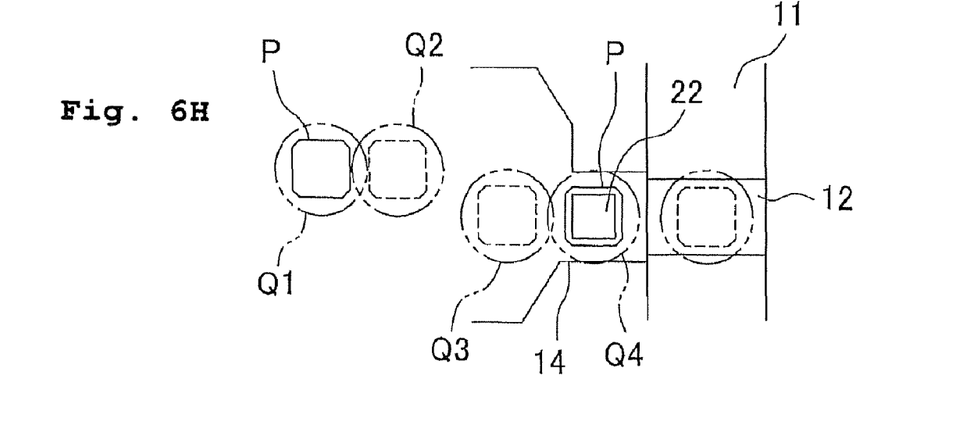
Figure 6I:
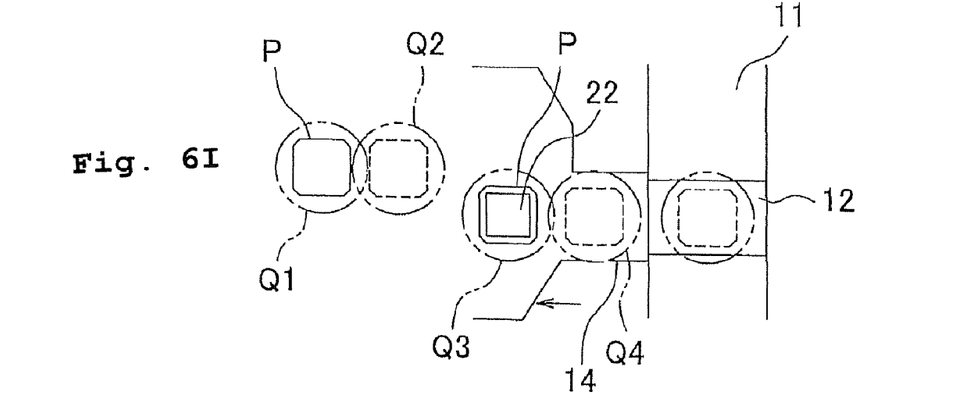
Figure 6J:
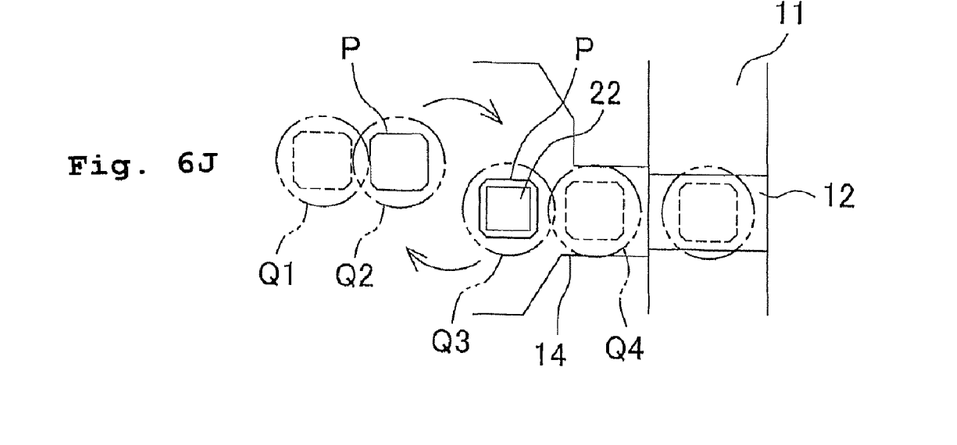

When the stacker crane 12 is retreated from the entering space S, the first cylinder 23 and the second cylinder 24 extend again so that the conveying plate 22 is moved into the intermediate station 14 (FIG. 6G). Then, the lifting device 34 is operated to lower the lift arms 35 and 35, and then, the new pallet P is transferred to the conveying plate 22 (FIG. 6H). Further, the first cylinder 23 and the second cylinder 24 are retracted to retreat the conveying plate 22, and the conveying plate positioning pin 26 is raised and inserted into the conveying plate positioning hole 28 so that the conveying plate 22 (that is, a new pallet P) is positioned at the stand-by position Q3 (FIG. 6I). Then, the new pallet P is stood-by at the stand-by position Q3 until machining to a work piece on the pallet P at the machining position is finished, and the pallet is exchanged by rotating of the pallet exchange arm 6 when the machining is finished (FIG. 6J).

As described above, a pallet P is transferred using the intermediate station 14.

According to the transferring structure of a pallet as described above, the intermediate station 14 is provided between the stacker crane 12 and the stand-by position Q3, and the intermediate station 14 is used as the temporally placing position Q4 to transfer the pallet P. Thus, a length of extending and retracting of an arm of the stacker crane 12 in the Z axis direction can be shortened. Further, it is not necessary to limit the weight of a work piece placed on the pallet, and it is not necessary to enlarge the size of a stacker crane. Therefore, the system has high flexibility and can be constituted with the present stacker crane 12.

Further, the intermediate station 14 is provided adjacently to the horizontal machining center 2, and the conveying plate 22 is supported by the cam followers 38, 38, . . . so as to enable the conveying plate 22 to horizontally move. Therefore, when the conveying plate 22 advances from the stand-by position Q3 to the intermediate station 14, the conveying plate 22, the first cylinder 23 and the second cylinder 24 may not be deformed by the weight of the work, and thus this system can be appropriately applied to a larger work.

Further, the intermediate station 14 includes the lifting device 34 and the lift arms 35 and 35 by which the pallet P is transferred between the conveying plate 22 and the intermediate station 14. Therefore, it is not necessary to provide a driving device to raise the conveying plate 22 on the stand-by station 21 side, and thus a structure on the stand-by station 21 side can be simplified. When the weight of a work piece is large, the pallet P can be transferred more smoothly and stably in the embodiment than a structure where the pallet P is transferred by up and down moving of the conveying plate 22. Furthermore, when the stacker crane is entered into the entering space S, a larger entering space can be kept below the pallet, since the first cylinder 23 and the second cylinder 24 are provided on the horizontal machining center 2 side, the pallet P is raised and supported by the lift arms 35 and 35 when the stacker crane 12 is entered into the entering space S and the conveying plate 22 is retreated on the horizontal machining center 2 side at that time.

In addition, the first positioning pins 27, 27, . . . for positioning a pallet P on the conveying plate 22 and the second positioning pins for positioning the pallet P on the stacker crane 12 are inserted into the first pin holes of the pallet P. Further, the exchange-time positioning pins for positioning the pallet P at the holding part 7 of the pallet exchange arm 6 and the third positioning pins 36 and 36 for positioning the pallet P on each lift arm 35 are inserted into the second pin holes of the pallet P. That is, the first pins holes and the second pin holes are shared with a plurality of positioning pins. Therefore, the positioning of the pallet P can be efficient, a structure of the pallet can be simplified, which result in cost reduction.

In addition, a transfer structure of a pallet according to the present invention is not limited to the above-described embodiments. The constitutions according to a machine tool, a stand-by station, an intermediate station, and a pallet conveying device can be properly changed according to necessity within a range not deviating from the object of the present invention.

For example, in the above-described embodiment, two kinds of pin holes are provided on the pallet P side. However, three kinds of pin holes can be applied so that only the first positioning pin and the second positioning pin are shared with the same pin holes. Further, pins can be provided on the pallet P side, while pin holes can be provided on the sides of a conveying plate, an intermediate station and a stacker crane.

Further, when a machine tool where a rotating center is deviated from a rotary axis as described above is used, the length of extending and retracting of a stacker crane cannot be structurally shortened unless an intermediate station is provided, and thus a transfer structure of the present invention is particularly useful. However, of course, the structure can be applied to a machine tool in which a rotary shaft of a pallet exchange arm is provided on a spindle line of a main spindle and a machine tool not having a pallet exchange arm.

Furthermore, a machining position and a stand-by position can be arranged on a device side, and a stacker crane and a pallet housing station can be arranged in parallel on the Z axis. In addition, a pallet can be transferred between an intermediate station and a stacker crane by not only up and down moving of a stacker crane but also up and down moving of lift arms.

What is claimed is:

1. A pallet transfer system for use with a pallet conveying device comprising a crane device capable of moving on a rail, provided on a frontward side of a pallet stand-by position, in right and left directions, and which is advanced and retreated in backward and frontward directions to transfer a pallet, and which is raised and lowered, the pallet transfer system comprising:
    a conveying plate provided at the pallet stand-by position, which is a position before the pallet is transferred to a machining position in a machine tool, and having a predetermined position on which the pallet is placed at the pallet stand-by position; and
    a transfer device for horizontally transferring the conveying plate having the pallet thereon from the pallet stand-by position to a pallet temporary placing position, between a frontward position and the pallet stand-by position, at an intermediate station,
    wherein the intermediate station comprises
        a supporting part having an opening in an upward direction for supporting the conveying plate having the pallet thereon and through which the crane device enters, and
        a lifting device for raising and lowering a pair of lift arms which support and lift the pallet from the conveying plate supported on the supporting part,
    whereby the pallet is transferred from the lift arms at the intermediate station to the crane device by means of relative upward and downward movement of the crane device and the lift arms.

2. The pallet transfer system according to claim 1, wherein the conveying plate comprises a first positioning pin to determine a position of the pallet placed thereon; the crane device comprises a second positioning pin to determine a position of the pallet being supported; and the pallet comprises a pin hole capable of receiving both the first positioning pin and the second positioning pin.

3. The pallet transfer system according to claim 1, wherein the intermediate station is provided adjacent to the pallet stand-by position;
wherein the supporting part comprises a pair of supporting walls projected between the lift arms;
wherein a plurality of cam followers are arranged in the frontward and backward directions on an opposite side of the supporting walls;
wherein the conveying plate, transferred from the pallet stand-by position to the pallet temporary placing position, is supported by the cam followers and is capable of moving horizontally; and
wherein the crane device enters between the supporting walls.

4. The pallet transfer system according to claim 2, wherein the intermediate station is provided adjacent to the pallet stand-by position;
wherein the supporting part comprises a pair of supporting walls projected between the lift arms;
wherein a plurality of cam followers are arranged in the frontward and backward directions on the opposite side of the supporting walls;
wherein the conveying plate, transferred from the pallet stand-by position to the pallet temporary placing position, is supported by the cam followers and is capable of moving horizontally; and
wherein the crane device enters between the supporting walls.

* * * * *